(12) United States Patent
Wang et al.

(10) Patent No.: US 7,474,456 B2
(45) Date of Patent: Jan. 6, 2009

(54) CONTROLLABLE COMPOSITE MATERIAL

(75) Inventors: Shih-Yuan Wang, Palo Alto, CA (US); Alexandre Bratkovski, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/700,297

(22) Filed: Jan. 30, 2007

(65) Prior Publication Data

US 2008/0192331 A1    Aug. 14, 2008

(51) Int. Cl.
*G02B 26/08* (2006.01)
*G02F 1/29* (2006.01)

(52) U.S. Cl. ........................ 359/315; 359/298

(58) Field of Classification Search ............ 359/315, 359/298, 316, 247; 216/72
See application file for complete search history.

(56) References Cited

U.S. PATENT DOCUMENTS

| | | | |
|---|---|---|---|
| 6,933,812 B2 | 8/2005 | Sarabandi et al. | |
| 2003/0042487 A1 | 3/2003 | Sarychev et al. | |
| 2004/0066251 A1 | 4/2004 | Eleltheriades et al. | |
| 2005/0122001 A1 | 6/2005 | Ma et al. | |
| 2005/0200540 A1 | 9/2005 | Isaacs et al. | |
| 2006/0109540 A1* | 5/2006 | Kueks et al. | 359/321 |
| 2007/0115540 A1* | 5/2007 | Bratkovski et al. | 359/342 |
| 2007/0188385 A1* | 8/2007 | Hyde et al. | 343/700 MS |

FOREIGN PATENT DOCUMENTS

WO    WO 2006/023195 A2    3/2006

OTHER PUBLICATIONS

Shadrivov, et. al., "Tunable Split-Ring Resonators for Nonlinear Negative-Index Metamaterials," Optics Exp., vol. 14, No. 20, pp. 9344-9349, Oct. 2, 2006.
Dolling, et. al., "Negative-Index Metamaterial at 780 nm Wavelength," Optics Letters, OSA, vol. 32, No. 1, pp. 53-55, Jan. 1, 2007.

* cited by examiner

*Primary Examiner*—Jessica T Stultz
*Assistant Examiner*—Mahidere S Sahle (57) ABSTRACT

An apparatus and related methods for controlling propagation of incident radiation are described. In one embodiment, the apparatus comprises a composite material operable to exhibit at least one of a negative effective permittivity and a negative effective permeability for incident radiation at an operating frequency. The composite material comprises electromagnetically reactive cells of small dimension relative to a wavelength of the incident radiation. Each of the electromagnetically reactive cells comprises first and second electromagnetically reactive segments microelectromechanically movable relative to each other according to an applied control signal such that at least one of a capacitive and inductive property of the electromagnetically reactive cells is temporally controllable according to the applied control signal.

30 Claims, 9 Drawing Sheets

CONTROLLABLE COMPOSITE MATERIAL

STATEMENT REGARDING FEDERALLY SPONSORED RESEARCH OR DEVELOPMENT

This invention was made with Government support under Agreement No. HR0011-05-3-0002, awarded by DARPA. The Government has certain rights in the invention.

FIELD

This patent specification relates generally to the propagation of electromagnetic radiation and, more particularly, to the temporal control of composite materials capable of exhibiting at least one of negative effective permeability and/or negative effective permittivity with respect to incident electromagnetic radiation.

BACKGROUND

Substantial attention has been directed in recent years toward composite materials capable of exhibiting negative effective permeability and/or negative effective permittivity with respect to incident electromagnetic radiation. Such materials, often termed metamaterials, generally comprise periodic arrays of electromagnetically resonant cells that are of substantially small dimension (e.g., 20% or less) compared to the wavelength of the incident radiation. Although the individual response of any particular cell to an incident wavefront can be quite complicated, the aggregate response the resonant cells can be described macroscopically, as if the composite material were a continuous material, except that the permeability term is replaced by an effective permeability and the permittivity term is replaced by an effective permittivity. Depending on the size, structure, and arrangement of the resonant cells, as well as the frequency at which incident radiation is applied, certain metamaterials can sometimes simultaneously exhibit both a negative effective permeability and a negative effective permittivity, such metamaterials being termed negative index materials.

Potential industrial applicabilities for metamaterials and negative index materials include so-called superlenses having the ability to image far below the diffraction limit to λ/6 and beyond, new designs for airborne radar, high resolution nuclear magnetic resonance (NMR) systems for medical imaging, microwave lenses, and other radiation processing devices. Issues arise in the realization of useful devices from such composite materials. By way of example, issues arise in providing for the temporal controllability of such composite materials. Other issues arise as would be apparent to one skilled in the art in view of the present disclosure.

SUMMARY

In accordance with an embodiment, an apparatus for controlling propagation of incident radiation is provided, comprising a composite material operable to exhibit at least one of a negative effective permittivity and a negative effective permeability for incident radiation at an operating frequency. The composite material comprises electromagnetically reactive cells of small dimension relative to a wavelength of the incident radiation. Each of the electromagnetically reactive cells comprises first and second electromagnetically reactive segments microelectromechanically movable relative to each other according to an applied control signal such that at least one of a capacitive and inductive property of the electromagnetically reactive cells is temporally controllable according to the applied control signal.

Also provided is a method for controlling propagation of incident electromagnetic radiation, comprising placing a composite material in the path of the incident electromagnetic radiation, the composite material operable to exhibit at least one of a negative effective permittivity and a negative effective permeability for incident radiation at an operating frequency. The composite material comprises electromagnetically reactive cells of small dimension relative to a wavelength of the incident radiation, each electromagnetically reactive cell comprising first and second electromagnetically reactive segments, and further comprises at least one microelectromechanical actuator coupled to control a relative position of the first and second electromagnetically reactive segments. The method further comprises applying a control signal to actuate the microelectromechanical actuator to temporally control at least one of a capacitive and inductive property of the electromagnetically reactive cells.

According to another embodiment, an apparatus for controlling propagation of incident radiation is provided, comprising a composite material operable to exhibit at least one of a negative effective permittivity and a negative effective permeability for incident radiation at an operating frequency. The composite material comprises a first layer comprising periodic metallic features of small size relative to a wavelength of the incident radiation, and a second layer generally parallel to the first layer and spatially separated therefrom, the second layer comprising one of a conductor material and a doped semiconductor material. The first layer is microelectromechanically movable toward and away from the second layer responsive to an applied control signal for allowing dynamic control of at least one of the effective permittivity and effective permeability of the composite material at the operating frequency.

Also provided is a method for controlling propagation of incident radiation, comprising placing a composite material in the path of the incident electromagnetic radiation, the composite material being operable to exhibit at least one of a negative effective permittivity and a negative effective permeability for incident radiation at an operating frequency. The composite material comprises a first layer having periodic metallic features of small size relative to a wavelength of the incident radiation. The composite material further a second layer generally parallel to the first layer and spatially separated therefrom, the second layer comprising one of a conductor material and a doped semiconductor material. The first layer is movable toward and away from the second layer by microelectromechanical actuation. The method further comprises applying a control signal to instantiate the microelectromechanical actuation for temporally controlling at least one of the effective permittivity and effective permeability of the composite material at the operating frequency.

According to another embodiment, an apparatus for controlling propagation of incident radiation at an operating frequency is provided, comprising a composite medium including a layer of metallic features of small size relative to a wavelength of the incident radiation. The layer of metallic features is periodically patterned such that the composite medium is operable to exhibit at least one of a negative effective permittivity and a negative effective permeability for the incident radiation at the operating frequency. The apparatus further comprises a slab positioned substantially adjacent to the composite medium, the slab comprising an electro-optic material substantially transparent at the operating frequency and having an intrinsic refractive index that is variable according to a strength of an electric field therein. The apparatus further comprises first and second electrical conductors positioned such that an electric field associated with a potential difference therebetween passes through the slab in an immediate vicinity of the layer of metallic features, whereby at least one of the effective permittivity and the effective permeability of the composite medium is temporally controllable according to an electrical control signal applied across the first and second electrical conductors.

Also provided is a method for controlling propagation of incident radiation, comprising placing a radiation control apparatus in the path of the incident electromagnetic radiation, the radiation control apparatus including a composite medium comprising a layer of metallic features of small size relative to a wavelength of the incident radiation. The layer of metallic features is periodically patterned such that the composite medium is operable to exhibit at least one of a negative effective permittivity and a negative effective permeability for the incident radiation at the operating frequency. The radiation control apparatus further includes a slab positioned substantially adjacent to the composite medium, the slab comprising an electro-optic material substantially transparent at the operating frequency and having an intrinsic refractive index that is variable according to a strength of an electric field therein. The method further comprises applying an electrical control signal across first and second electrical conductors that are positioned such that an electric field associated with a potential difference therebetween passes through the slab in an immediate vicinity of the layer of metallic features. At least one of the effective permittivity and the effective permeability of the composite medium is thereby temporally controlled according to the applied electrical control signal.

According to another embodiment, an apparatus for controlling propagation of incident radiation at an operating frequency is provided, comprising a slab of material that is piezoelectric, electro-optic, and substantially transparent at the operating frequency. The apparatus further comprises a composite medium including a layer of metallic features of small size relative to a wavelength of the incident radiation, the layer of metallic features being periodically patterned such that the composite medium is operable to exhibit at least one of a negative effective permittivity and a negative effective permeability for the incident radiation at the operating frequency. The layer of metallic features is disposed longitudinally along a surface of the slab. The apparatus further comprises a surface acoustic wave launching device coupled to the slab to launch surface acoustic waves thereon in accordance with an applied electrical control signal, the surface acoustic waves propagating on the slab along a longitudinal path that is coincident with the longitudinally disposed layer of metallic features. For at least one location along the layer of metallic features coincident with the surface acoustic waves, at least one of the effective permittivity and the effective permeability of the composite medium is thereby temporally varied according to the applied electrical control signal.

Also provided is a method for controlling propagation of incident radiation, comprising placing a radiation control apparatus in the path of the incident electromagnetic radiation, the radiation control apparatus including a composite medium comprising a layer of metallic features of small size relative to a wavelength of the incident radiation. The layer of metallic features is periodically patterned such that the composite medium is operable to exhibit at least one of a negative effective permittivity and a negative effective permeability for the incident radiation at the operating frequency. The layer of metallic features is disposed longitudinally along a surface of a slab comprising a material that is piezoelectric, electro-optic, and substantially transparent at the operating frequency. The method further comprises launching at least one surface acoustic wave into the slab such that the surface acoustic wave propagates along a longitudinal path coincident with the longitudinally disposed layer of metallic features, thereby causing a temporal variation in at least one of the effective permittivity and the effective permeability of the composite medium for at least one location coincident with the at least one surface acoustic wave.

According to another embodiment, an apparatus for controlling propagation of incident radiation at an operating frequency is provided, comprising a composite medium including a layer of metallic features of small size relative to a wavelength of the incident radiation. The layer of metallic features is periodically patterned such that the composite medium is operable to exhibit at least one of a negative effective permittivity and a negative effective permeability for the incident radiation at the operating frequency. The apparatus further comprises an electrically pumped gain medium layer proximal to the layer of metallic features and having an amplification band that includes the operating frequency. The apparatus further comprises a source of electric current for pumping the gain medium, wherein the source is configured to vary the pump current according to an applied control signal for providing temporal control of at least one of the effective permittivity and the effective permeability of the composite medium.

Also provided is a method for controlling propagation of incident radiation, comprising placing a composite medium in the path of the incident electromagnetic radiation, the composite medium comprising a layer of metallic features of small size relative to a wavelength of the incident radiation. The layer of metallic features is periodically patterned such that the composite medium is operable to exhibit at least one of a negative effective permittivity and a negative effective permeability for the incident radiation at the operating frequency. The method further comprises temporally varying an amount of electrical pump current provided to a gain medium layer that is proximal to the layer of metallic features, the gain medium layer having an amplification band that includes the operating frequency. The temporal variation of the amount of pump current provides temporal control of at least one of the effective permittivity and the effective permeability of the composite medium.

DETAILED DESCRIPTION

Figure 1:
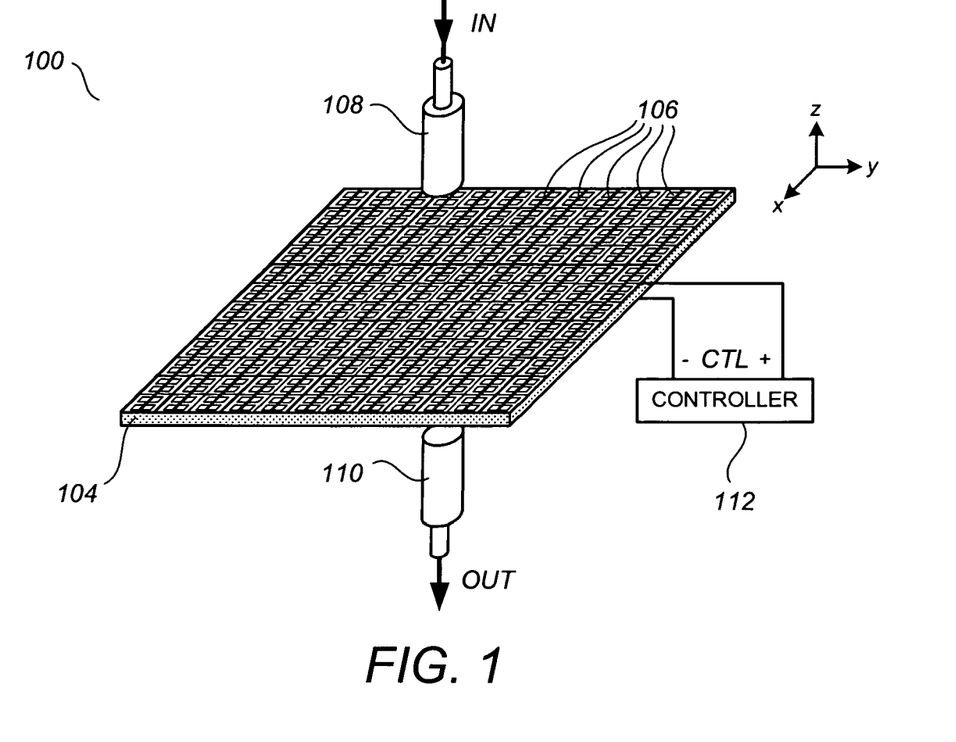
FIG. 1 illustrates an apparatus for controlling propagation of incident radiation according to an embodiment.

FIG. 1 illustrates an apparatus 100 for controlling the propagation of incident electromagnetic radiation according to an embodiment. Apparatus 100 comprises a composite material 104 comprising a plurality of microelectromechanically actuable units 106. Microelectromechanically actuable devices or units are hereinbelow referenced as MEMS-actuable devices or units. Apparatus 100 further comprises an optical source 108 that causes incident radiation to impinge upon the composite material 104, and an optical receiver 110 configured to receive at least a portion of the incident radiation that has propagated through the composite material 104. Apparatus 100 further comprises a controller 112 applying an electrical control signal CTL to the composite material 104.

In the particular example of FIG. 1, the optical source 108 receives an input optical signal IN, such as can be received from an optical fiber, and projects it toward the composite material 104. According to one embodiment, the composite material 104 is operable to exhibit at least one of a negative effective permittivity and a negative effective permeability for incident radiation at an operating frequency. There exists at least one control state for the applied control signal CTL, which may include an uncontrolled state (e.g., the controller 112 is disconnected), for which the composite material achieves the negative effective permittivity and/or negative effective permeability for incident radiation at the operating frequency.

By way of clarification in view of the varying terminologies sometimes associated with new fields of endeavor, and not by way of limitation, metamaterial herein refers to a composite material that is operable to exhibit a negative effective permittivity and/or a negative effective permeability. When so operated the metamaterial is referenced herein as being in a metamaterial state or metamaterial condition. Negative index material refers herein to a metamaterial operable to simultaneously exhibit both a negative effective permittivity and a negative effective permeability, and when so operated the negative index material is referenced herein as being in a negative index state or negative index condition. According to an embodiment, when the composite material 104 is operated into a metamaterial state, it can exhibit a variety of interesting behaviors, including a so-called superlensing phenomenon which can achieve near-field imaging of the optical source 108 onto the optical receiver 110, thereby transferring a substantial percentage of the incident radiation thereto. When not in such state, a substantially lesser or negligible amount of the incident radiation is so transferred. Thus, the apparatus 100 can be operated as a modulator in which the incident radiation is a carrier signal and the electrical control signal CTL is a modulating signal, such as an information signal. It is to be appreciated, however, that any of a variety of different applications involving the control of propagating radiation including, but not limited to, radiation switching, radiation beam scanning, two-dimensional imaging, and other applications leveraging the superlensing phenomenon or any other of the variety of interesting metamaterial state behaviors, can be achieved by a temporally controllable composite medium according to FIG. 1 and other embodiments herein, all of which are within the scope of the present teachings.

Thus, for example, although one or more embodiments described herein provides for temporal control of a magnitude of an output signal OUT collected by the optical receiver 110, in other embodiments the temporal control can be of a steering angle or other aspect of the propagated radiation that can be controlled by controlling the effective permittivity and/or effective permeability (and accordingly the effective refractive index) of the composite material 104. Moreover, depending on the particular application, such temporal control can be provided uniformly across the entire surface of the composite material 104 using a single control signal, or alternatively can be provided on a localized or per "pixel" basis across the surface of the composite material 104 using many individual control signals.

For one embodiment applicable to visible and near-infrared operating frequencies, the effective permittivity should be negative for achieving superlensing. However, it is not outside the scope of the embodiments for there to be other controlled metamaterial states with different combinations of effective permittivity and effective permeability values that achieve such superlensing, or that achieve another method of causing appreciable collection of radiation energy at the optical receiver 110 such that a modulated result is detected. For purposes of clarity and not by way of limitation, the composite material 104 is referenced herein as being in a transmitting metamaterial state when there is such appreciable collection of radiation energy at the optical receiver 110.

Figure 2:
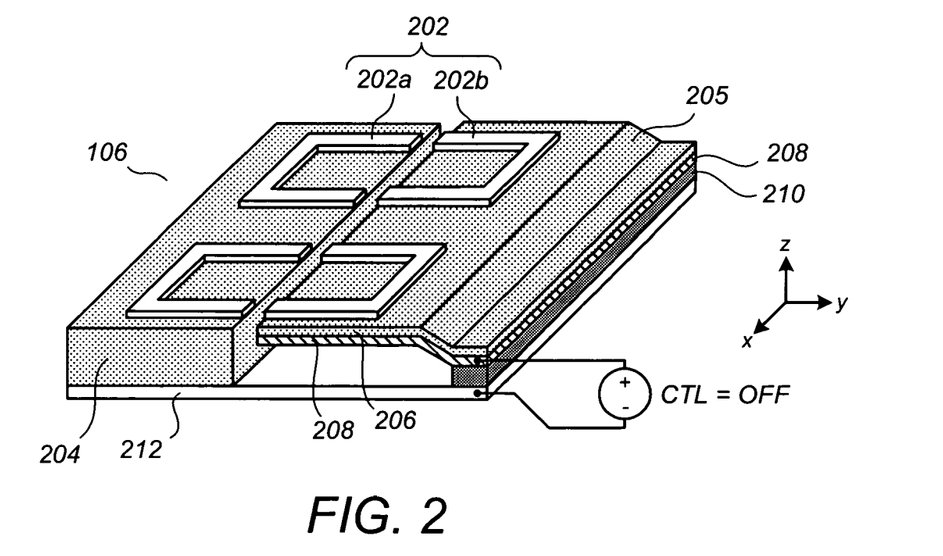
FIGS. 2-3 illustrate electromagnetically reactive cells of the apparatus of FIG. 1 according to an embodiment.
Figure 3:
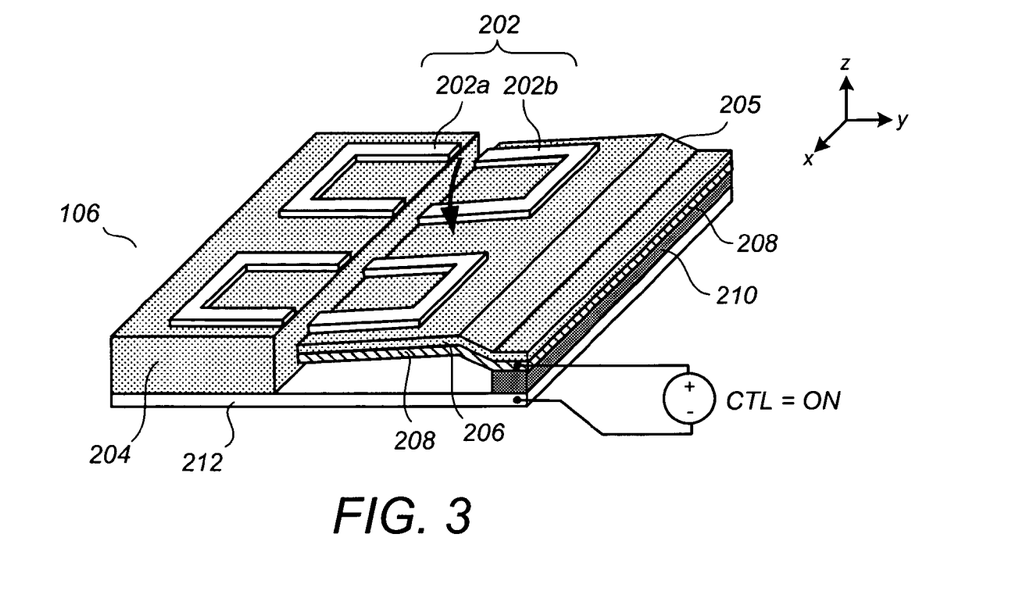

FIGS. 2-3 illustrate a closer perspective view of a MEMS-actuable unit 106. MEMS-actuable unit 106 comprises two electromagnetically reactive cells 202, each electromagnetically reactive cell 202 comprising a first electromagnetically reactive segment 202a and a second electromagnetically reactive segment 202b. Although an example of two electromagnetically reactive cells per MEMS-actuable unit is illustrated in FIGS. 2-3, in other embodiments there may be provided only a single electromagnetically reactive cell per MEMS-actuable unit, and in still other embodiments there may be tens, hundreds, or even thousands of electromagnetically reactive cells per MEMS-actuable unit. According to one embodiment, the MEMS-actuable units 106 are uniform and connected to a common electrical control signal. In other embodiments, the MEMS-actuable units 106 may be driven by distinct electrical control signals.

MEMS-actuable unit 106 is configured such that the electromagnetically reactive segment 202b is microelectromechanically movable relative to the electromagnetically reactive segment 202a responsive to changes in an electrostatic control signal CTL, thereby varying at least one of a capacitive and inductive property of the electromagnetically reactive cell 202. MEMS-actuable unit 106 comprises a base layer 212, which may comprise a doped semiconductor such as silicon, and a hingeable element 205 formed above an insulator/support 210, the hingeable element 205 comprising a conductive (or heavily doped) layer 208 that flexes toward the base layer 212 upon application of a voltage therebetween. The electromagnetically reactive segment 202a remains fixed upon an insulating support 204, such as silicon dioxide, while the electromagnetically reactive segment 202b, which is separated from the layer 208 by an insulating layer 206 such as silicon dioxide, moves up and down and angularly (and/or toward and away from) the electromagnetically reactive segment 202a such that a size of a capacitive gap therebetween is controlled.

Figure 4:
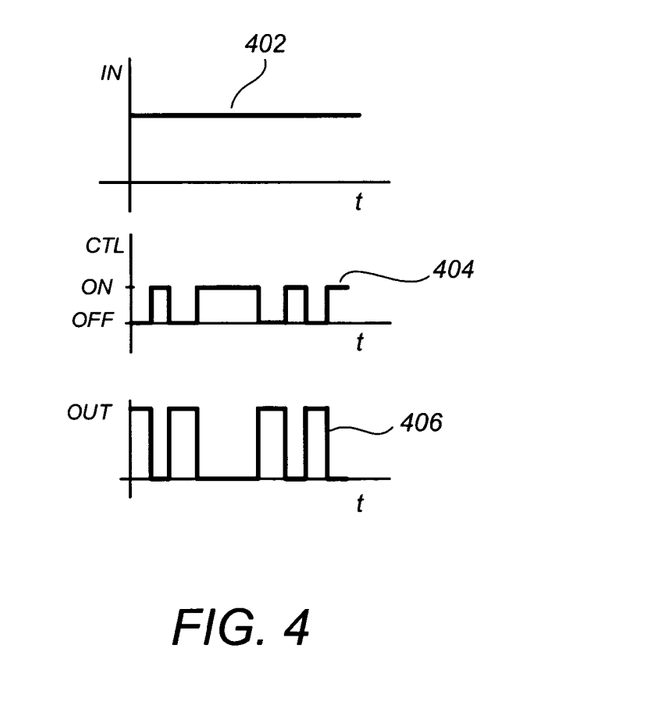
FIG. 4 illustrates a time plot of an incident radiation intensity, a time plot of an applied control signal, and a time plot of an output radiation intensity for the apparatus of FIG. 1 according to an embodiment.

FIG. 4 illustrates a time plot 402 of the incident radiation intensity IN, a time plot 404 of the applied control signal, and a time plot 406 of the output radiation intensity OUT for the apparatus of FIGS. 1-3 according to an embodiment. According to one embodiment in which the MEMS-actuable units 106 are uniform and connected to a common electrical control signal, the electromagnetically reactive segments 202a and 202b are "pre-tuned" for resonance of the electromagnetically reactive cells 202, that is, they are mutually positioned in a resonant configuration for an uncontrolled (e.g., disconnected or zero-voltage) state of the control signal for providing a transmitting metamaterial state. In such case, the output signal OUT is in an "ON" state. Upon application of a nonzero control voltage, even one that is relatively modest, the electromagnetically reactive cell 202 will "detune" out of resonance, i.e., the resonant frequency will shift away from the operating frequency, in which case the output signal OUT changes to an "OFF" state.

According to an embodiment, the electromagnetically reactive segments 202a and 202b are comparable to each other with respect to at least one of shape, area (i.e., area generally bounded by an outline of the electromagnetically reactive segment), and conductor length. A good range of achievable effective permeability, effective permittivity, effective refractive index, steering angle, or other controlled characteristic, in addition to good precision, speed of controllability, and/or speed of switching is thereby provided. This is to be contrasted with simple electrical shunting using a small piece of metal that does not have any appreciable capacitance or inductance in its own right. For one embodiment, the overall conductor length of a smaller/shorter one of the electromagnetically reactive segments is at least 25% of the overall conductor length of a larger/longer one. For another embodiment, the area of a smaller/shorter one of the electromagnetically reactive segments is at least 25% of the area of a larger/longer one. For another embodiment, the electromagnetically reactive segments 202a and 202b are substantially identical to each other, as with the embodiment of FIGS. 2-3.

Figure 5:
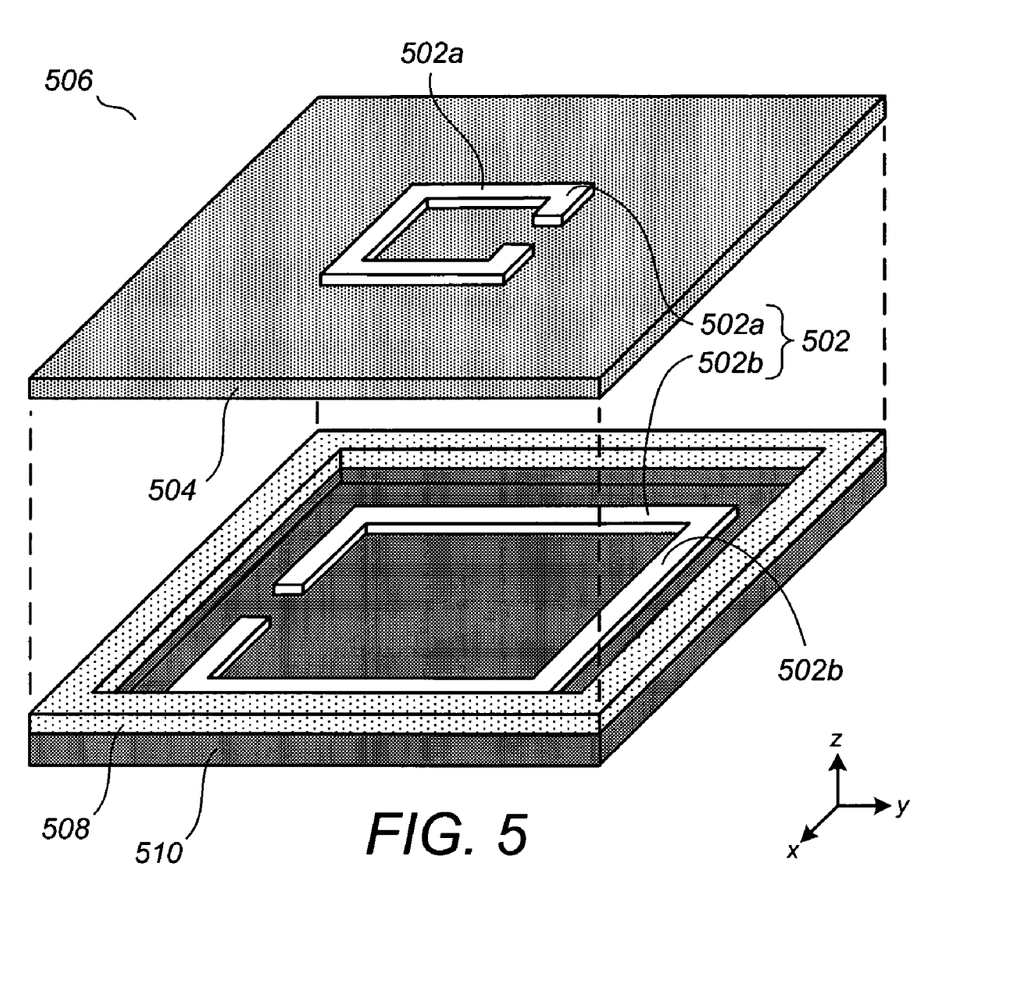
FIGS. 5-7 illustrate an electromagnetically reactive cell of an apparatus for controlling propagation of incident radiation according to an embodiment.

FIG. 5 illustrates an exploded perspective view of an electromagnetically reactive cell 502 of an apparatus for controlling propagation of incident radiation according to an embodiment, the electromagnetically reactive cell 502 being a sole electromagnetically reactive cell of a MEMS-actuable unit 506. The MEMS-actuable unit 506 may be used in a configuration similar to that of MEMS-actuable unit 106 in the apparatus 100 of FIG. 1, supra. Electromagnetically reactive cell 502 has a square split-ring resonator pattern, comprising a first electromagnetically reactive segment 502a and a second electromagnetically reactive segment 502b that are microelectromechanically movable relative to each other responsive to an externally applied electrical control signal for temporally varying a resonant characteristic thereof (e.g., inductive and/or capacitive characteristic). An intermediate layer 508 comprising an insulator such as silicon dioxide is patterned in conjunction with a lower layer 510, which may comprise a semiconductor such as silicon doped with an impurity of a first type (e.g., n-doped or p-doped), to form a well or void across which is disposed a thin upper layer 504 comprising a semiconductor such as silicon doped with an impurity of a second type (e.g., p-doped or n-doped). The electromagnetically reactive segment 502a is disposed on the upper layer 504, while the electromagnetically reactive segment 502b is disposed along the bottom of the well or void formed in the lower layer 510. The layers 504, 508, and 510 should of course be substantially transparent to incident radiation at the operating frequency. The upper layer 504 should be thin enough as to be restorably flexible or membraneous, and is comprised of a 20-nm thick doped silicon semiconductor layer in one nonlimiting example.

Figure 6:
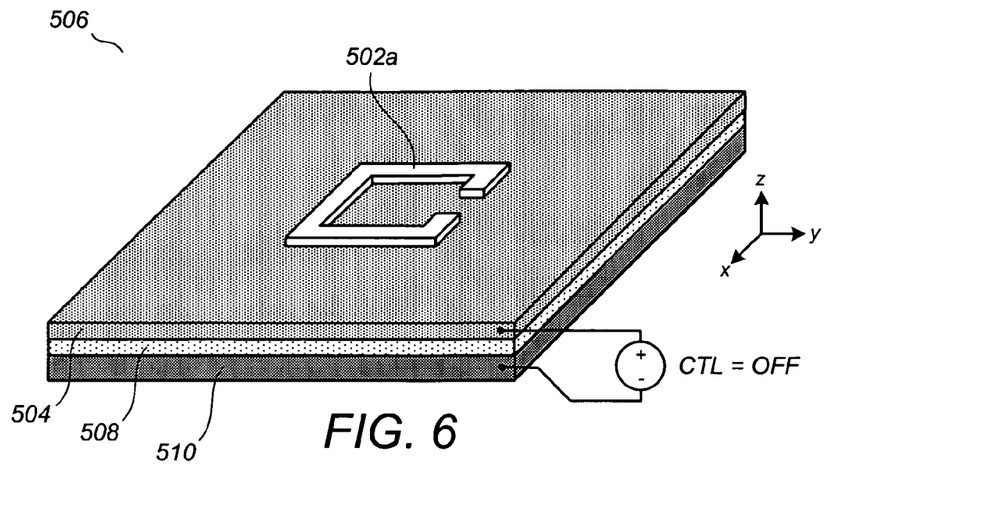
Figure 7:
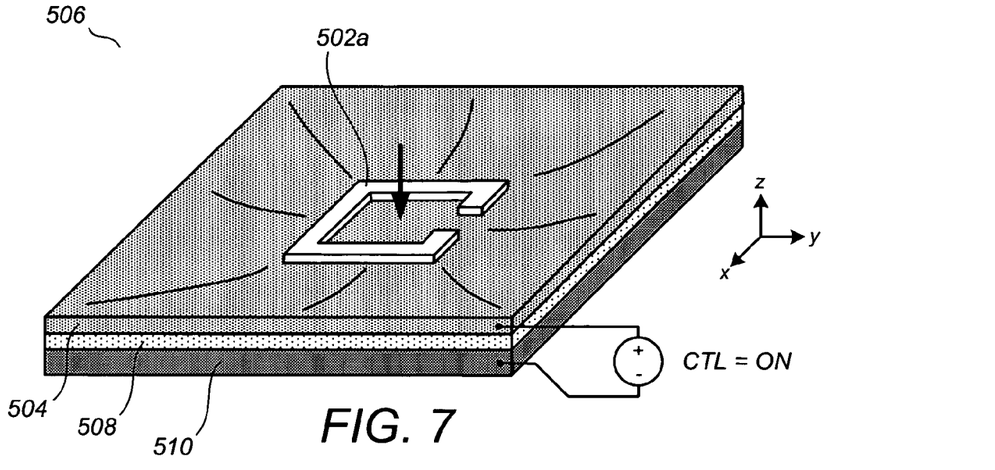

FIGS. 6-7 illustrate the MEMS-actuable unit 506 in a non-actuated state and an actuated state, respectively. Upon application of an electrostatic control voltage, the upper layer 504 deforms concavely downward toward the lower layer 510, thereby bringing the electromagnetically reactive segment 502a closer to the electromagnetically reactive segment 502b to vary a resonant characteristic of the electromagnetically reactive cell 502. For one embodiment, the upper layer 504 comprises silicon nitride ($Si_3N_4$).

Figure 8:
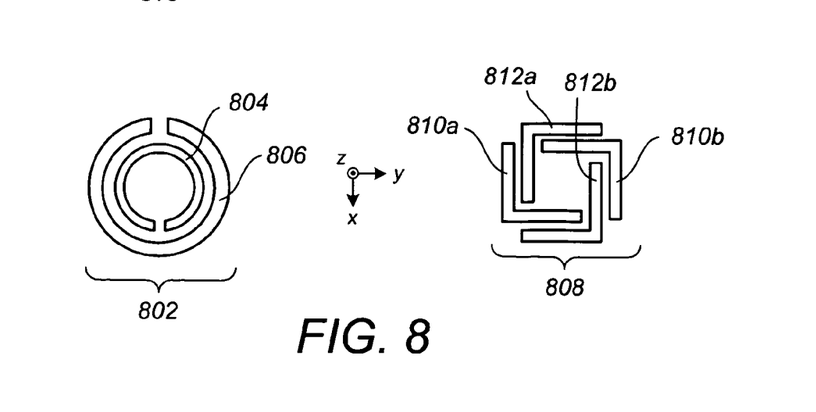
FIG. 8 illustrates examples of electromagnetically reactive segments according to one or more of the embodiments.

FIG. 8 illustrates some of the many examples of electromagnetically reactive cells and their associated electromagnetically reactive segments that may be incorporated into one or more of the embodiments, including a circular split-ring resonator 802 comprising an inner split-ring segment 804 and an outer split-ring segment 806. Also illustrated is an electromagnetically reactive cell 808 comprising four electromagnetically reactive segments 810a, 810b, 812a, and 812b. By way of example, the electromagnetically reactive segments 810a and 810b may be positioned in the well of the lower layer 510 of the MEMS-actuable unit 506 of FIG. 5, while the electromagnetically reactive segments 812a and 812b are positioned on the upper layer 504. A variety of other segmentable shapes and combinations thereof (e.g., swiss rolls, gammadions, parallel nanowire resonant cells, etc.) are also within the scope of the present teachings.

According to another embodiment (not shown), the upper layer 504 of the MEMS-actuable unit 506 can comprise a large population of electromagnetically reactive cells, while the lower layer 510 is devoid of electromagnetically reactive cells or electromagnetically reactive segments. As the upper surface is flexed downward toward the lower surface, carriers present in the lower layer 510 become closer to the electromagnetically reactive cells on the upper layer and can perturb a resonant characteristic thereof. Small changes in planar orientation among the electromagnetically reactive cells brought about by the downward flexing can also have a resonance-perturbing effect. In one example applicable at an exemplary operating wavelength of 1550 nm, the well structure can be about 20 μm wide and about 100 nm deep, and a layer comprising periodic metallic features of small size relative to the 1550 nm wavelength can be disposed on the upper layer, wherein the layer of periodic metallic features comprises a 100×100 array of metallic resonant structures such as split-ring resonators each about 100 nm wide and having a 200 nm inter-center spacing.

Figure 9:
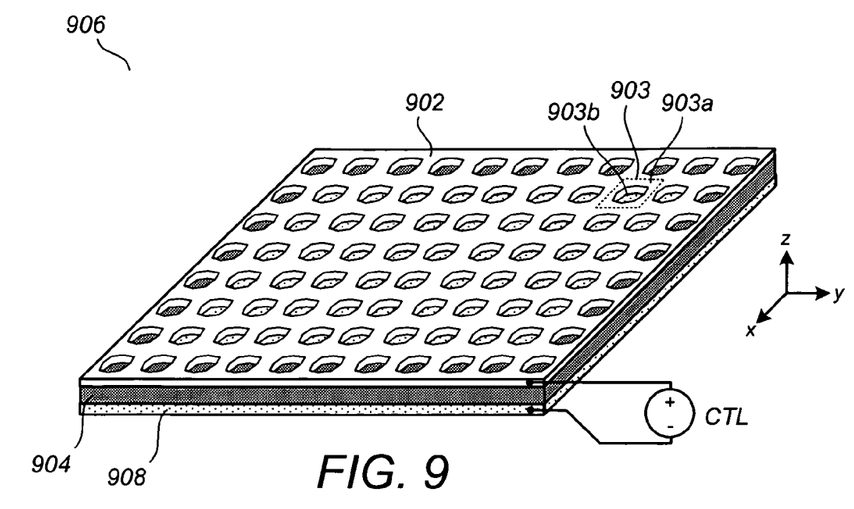
FIG. 9 illustrates an apparatus for controlling propagation of incident radiation according to an embodiment.

FIG. 9 illustrates a perspective view of a MEMS-actuable unit 906 that may be used in a configuration similar to that of MEMS-actuable unit 106 in the apparatus 100 of FIG. 1, supra, for providing temporal control of incident electromagnetic radiation according to an embodiment. MEMS-actuable unit 906 comprises an upper layer 902 comprising periodic metallic features 903 of small size relative to a wavelength of the incident radiation. Each metallic feature 903 comprises a square region 903a of a highly conductive metal, such as gold or silver, into which a nonmetallic dielectric material 903b, such as air, is patterned. The upper layer 902 thus comprises a continuous metallic membrane and is disposed above a lower layer 908. More particularly, the first layer 902 is suspendably supported above the lower layer 908 by an electrically insulating intermediate material layer 904 that forms a rim-like support structure. Alternative to the rim-like structure of FIG. 9, the electrically insulating material can instead form discrete posts (not shown) periodically spaced to support the upper layer 902 above the lower layer 908. The lower layer 908 can comprise doped silicon or other doped semiconductor material. In an alternative embodiment (not shown), the lower layer 908 can comprise a continuous metallic membrane patterned in a manner similar to the upper layer 902.

Figure 10:
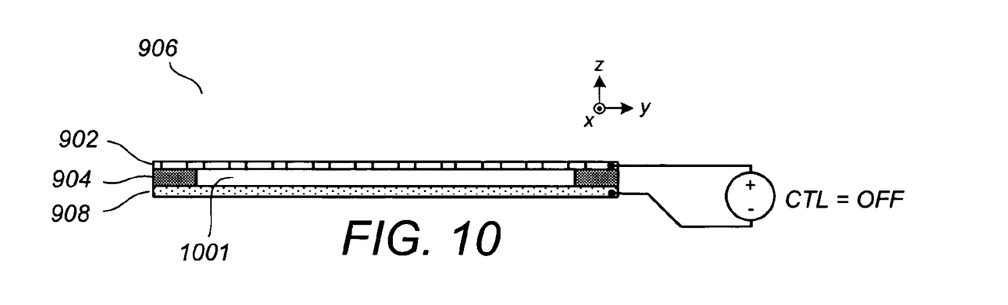
FIGS. 10-11 illustrate cross-sectional views of the apparatus of FIG. 9.
Figure 11:
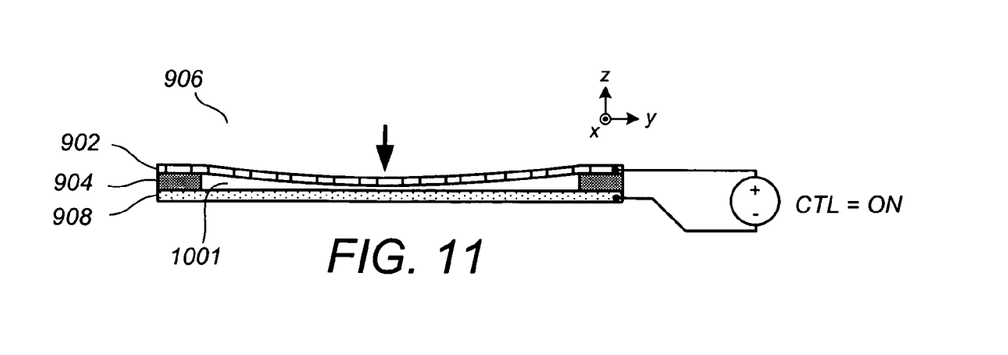

FIGS. 10-11 illustrate cross-sectional views of the MEMS-actuable unit 906 in non-actuated and actuated states, respectively. A gap 1001 between the upper layer 902 and the lower layer 908 can comprise air, vacuum, a dielectric liquid, or soft dielectric solid. Upon electrostatic actuation, the upper layer 902 deforms between a substantially planar shape (FIG. 10) and a shallow concavity directed toward the lower layer 908 (FIG. 11). For an alternative embodiment (not shown) in which the lower layer 908 also comprises a continuous metallic membrane patterned with nonmetallic holes, the lower layer also deforms upward toward the upper layer 902.

By way of example and not by way of limitation, the upper layer 902 may comprise a metallic "fishnet" structure, a continuous membrane of silver about 80 nm thick having generally square air holes 903b formed therein, the air holes being roughly about 200 nm wide and having center-to-center spacings of about 300 nm. The generally square air holes 903 can slightly depart from a perfect square by having opposing sides that are 198 nm apart at their centers and 182 nm apart near the corners. With these dimensions, the operating frequency corresponds to a free-space wavelength of about 780 nm at the higher end of the visible spectrum. The upper layer may be about 20 μm wide and the intermediate layer 904 may be about 20 nm thick.

Figure 12:
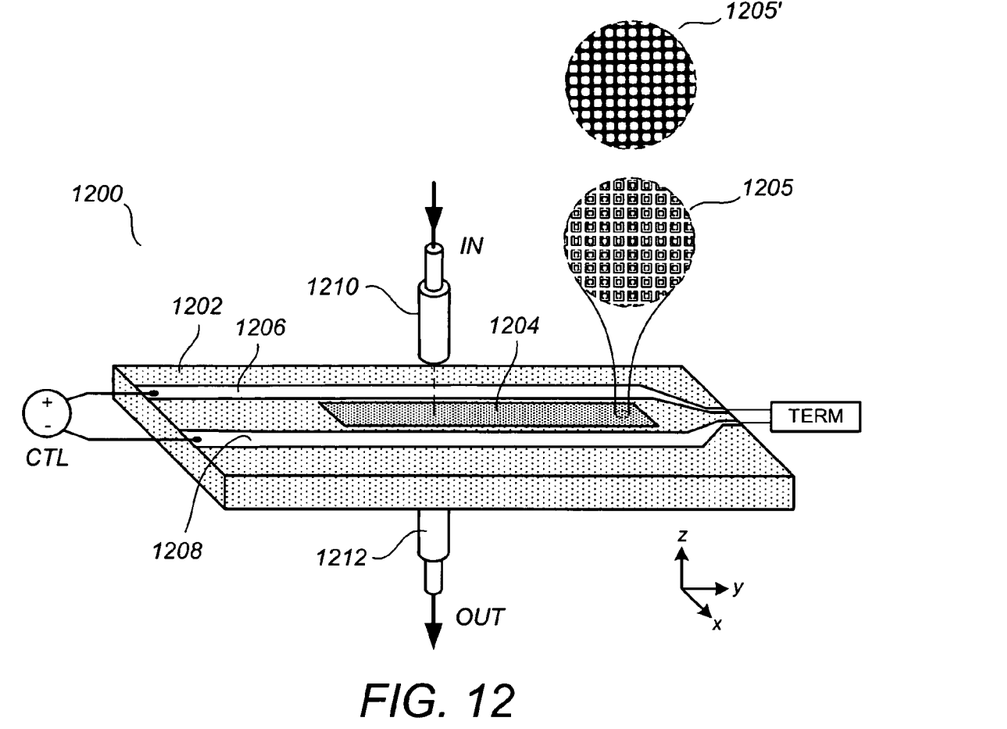
FIG. 12 illustrates a perspective view of an apparatus for controlling propagation of incident radiation according to an embodiment.

FIG. 12 illustrates an apparatus 1200 for controlling propagation of incident radiation at an operating frequency according to an embodiment. A composite medium is provided comprising a layer 1204 of metallic features of small size relative to a wavelength of the incident radiation, the composite medium being operable to exhibit a negative effective permittivity and/or a negative effective permeability for incident radiation at an operating frequency. Shown in FIG. 12 are two nonlimiting examples for the metallic feature layer 1204, including a periodic array of discrete metallic resonant structures 1205 and a metallic fishnet structure 1205'. The metallic feature layer 1204 is disposed on a slab 1202 comprising an electro-optic material, such as lithium niobate or lithium tantalate, that is substantially transparent at the operating frequency and has an intrinsic refractive index that is variable according to a strength of an applied electric field.

Disposed along the slab 1202 on either side of the metallic feature layer 1204 are electrical conductors 1206 and 1208 having a transmission line-style configuration including a transmission line terminator (TERM). The transmission line is driven by an externally applied electrical control signal CTL. The induced electric field between the electrical conductors passes through the slab 1202 in an immediate vicinity of the metallic feature layer 1204, thereby varying the intrinsic refractive index of the slab 1202, which in turn causes a variation in the effective permittivity and/or effective permeability of the composite material with respect to radiation at the operating frequency, which impinges thereupon from a radiation source 1210. In one embodiment, the metallic feature layer 1204 is "pre-tuned" to exhibit a negative effective permittivity and/or negative effective permeability when no control signal is applied such that there is a transmitting metamaterial state between the radiation source 1210 and a radiation receiver 1212, resulting in an "ON" modulation state. Then, upon application of a nonzero control signal, the metallic feature layer 1204 is detuned from the resonant state, resulting in an "OFF" modulation signal. Modulation rates can vary from the quasi-static to into the high GHz range depending on the particular transmission line characteristics.

As used herein, a material is electro-optic that has an electro-optic coefficient that approaches that of lithium niobate, which has an electro-optic coefficient of about 30 picometers per volt (r33) at optical communications frequencies, or lithium tantalate.

Figure 13:
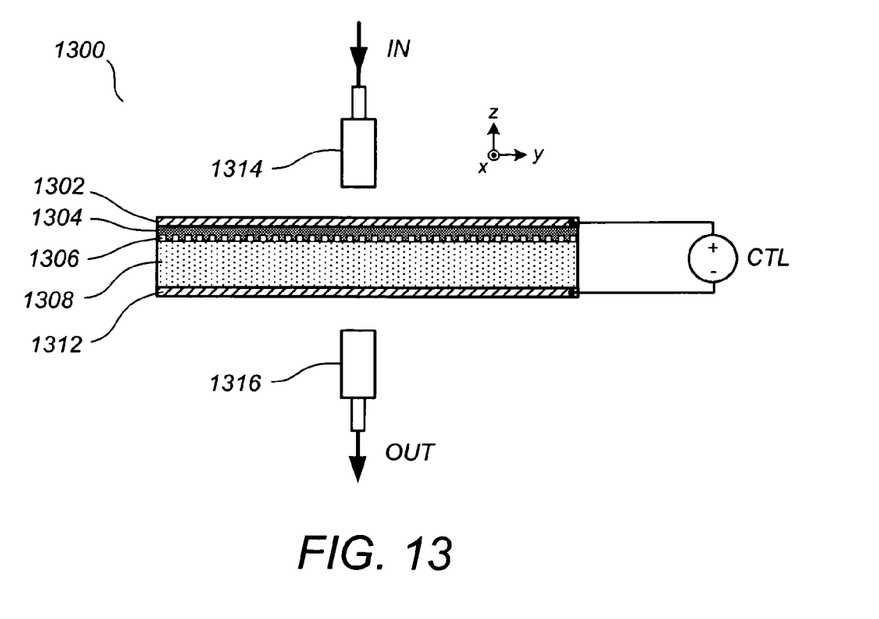
FIG. 13 illustrates a cross-sectional view of an apparatus for controlling propagation of incident radiation according to an embodiment.

FIG. 13 illustrates an apparatus 1300 for controlling propagation of incident radiation at an operating frequency according to an embodiment, which is also based on varying an intensity of an electric field in an electro-optic material in the immediate vicinity of resonant metallic structures. The apparatus 1300 comprises a metallic feature layer 1306 similar to the metallic feature layer 1204 of FIG. 12 disposed on a slab 1308 of electro-optic, transparent material such as lithium niobate. First and second conductors 1302 and 1312 are positioned above and below the metallic feature layer 1306 and slab 1308 as shown, the metallic feature layer 1306 being separated from the first electrical conductor 1302 by an insulating layer 1304. On/off or variable control of a transmitting metamaterial state between a radiation source 1314 and a radiation receiver 1316 is provided by application of an electrical control signal across the first and second conductors 1302 and 1312. Preferably, the slab 1308 is as thin as possible (e.g., in the tens of nanometers) so that an appreciable electric field can be built up to vary the effective permittivity and/or the effective permeability.

Figure 14:
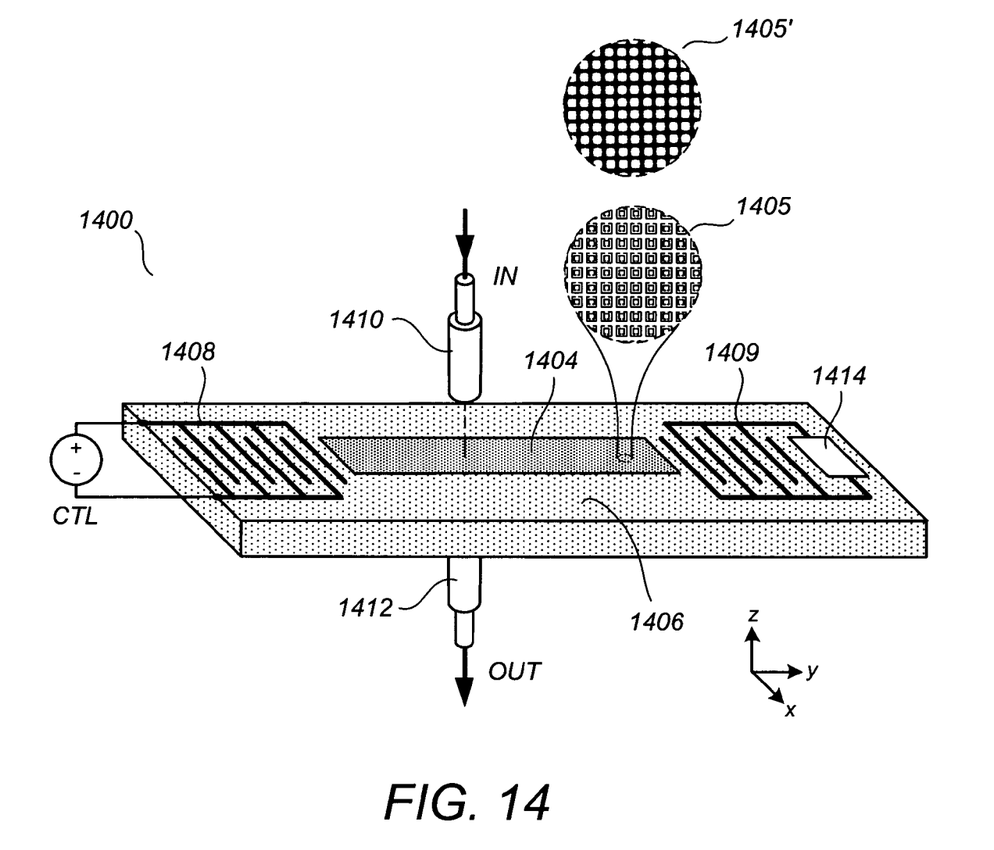
FIG. 14 illustrates an apparatus for controlling propagation of incident radiation according to an embodiment.

FIG. 14 illustrates an apparatus 1400 for controlling propagation of incident radiation at an operating frequency according to an embodiment. A composite medium is provided comprising a layer 1404 of metallic features of small size relative to a wavelength of the incident radiation, the composite medium being operable to exhibit negative effective permittivity and/or negative effective permeability for incident radiation at an operating frequency. Shown in FIG. 14 are two nonlimiting examples for the metallic feature layer 1404, including a periodic array of discrete metallic resonant structures 1405 and a metallic fishnet structure 1405'. The metallic feature layer 1404 is longitudinally disposed on a slab 1406 comprising a material that is piezoelectric, electro-optic, and that is substantially transparent at the operating frequency, with exemplary suitable materials including lithium niobate and lithium tantalate.

The apparatus 1400 further comprises a surface acoustic wave launching device, such as an interdigitated transducer (IDT) 1408, coupled to the slab 1406 to launch surface acoustic waves thereon in accordance with an applied electrical control signal CTL. The surface acoustic waves propagate on the slab along a longitudinal path (i.e. in the +y direction in FIG. 14) that at least partially coincides with the longitudinally disposed metallic feature layer 1404. Associated with any particular surface acoustic wave, which can be a traveling wave, a standing wave, a single-pulse wave, etc., is a corresponding electric field variation that, in turn, causes a perturbation in the effective permittivity and/or effective permeability of the composite medium.

In one embodiment, the metallic feature layer 1404 is "pre-tuned" to exhibit to exhibit a negative effective permittivity and/or negative effective permeability when no surface acoustic wave energy is present such that there is a transmitting metamaterial state between a radiation source 1410 and a radiation receiver 1412, resulting in an "ON" modulation state. However, as an acoustic surface wave intensity peak passes by a relevant area of the metallic feature layer 1404, that area is detuned from the resonant state, resulting in a "OFF" modulation signal. Modulation rates in the GHz range can be achieved depending on the particular slab characteristics. A receiving IDT 1409 and appropriate terminating load 1414 are provided where one-way surface acoustic waves are desired. Alternatively, the receiving IDT 1409 can be omitted where standing surface acoustic wave operation is desirable.

Figure 15:
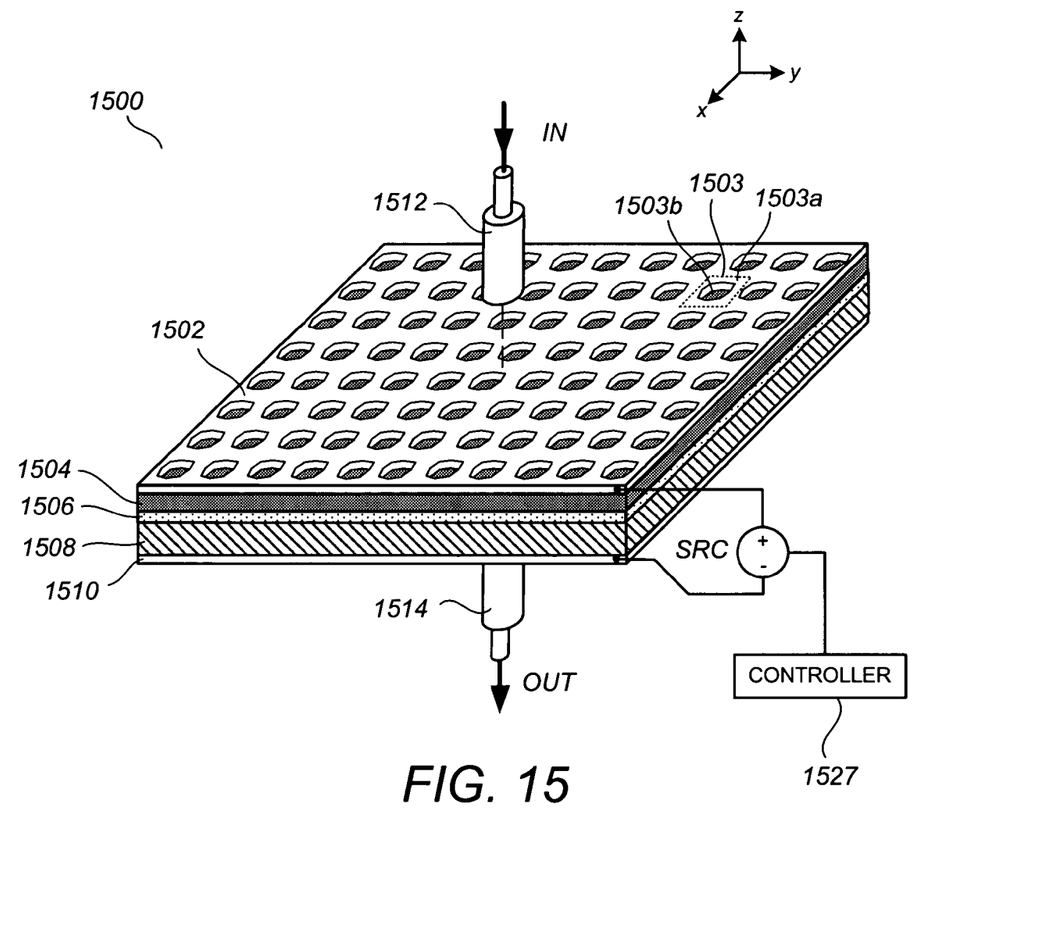
FIG. 15 illustrates an apparatus for controlling propagation of incident radiation according to an embodiment.

FIG. 15 illustrates an apparatus 1500 for controlling propagation of incident radiation at an operating frequency according to an embodiment. A composite material comprising a metallic feature layer 1502 is provided, comprising periodic metallic features 1503 of small size relative to a wavelength of the incident radiation. Each metallic feature 1503 comprises a square region 1503a of a highly conductive metal, such as gold or silver, into which a nonmetallic dielectric material 1503b, such as air, is patterned. The metallic feature layer 1502 may be dimensioned in a manner similar to the metallic upper layer 902 of FIG. 9, supra. Apparatus 1500 further comprises an electrically pumped gain medium layer 1506 proximal to the metallic feature layer 1502 having an amplification band that includes the operating frequency. For one embodiment, the gain medium layer 1506 comprises multiple quantum wells and is separated from the metallic feature layer 1502 by a doped semiconductor layer 1504 that is preferably very thin, e.g., less than 100 nm thick and even more preferably on the order of tens of nanometers or less. The gain medium layer 1506, which for multiple quantum wells is about 1-3 nm in thickness, is disposed atop a semiconductor layer 1508 doped oppositely than the semiconductor layer 1504. An ohmic contact layer 1510 is disposed beneath the semiconductor layer 1508, the ohmic contact material preferably covering a minimal amount of surface area for avoiding radiation signal loss.

An electric pump current source (SRC) is coupled to the metallic feature layer 1502 and the ohmic contact layer 1510 such that electrical pump current passes through the multiple quantum well layer positioned therebetween. According to an embodiment, the electric pump current is varied according to an applied control signal, such as provided by a controller 1527, whereby temporal control of the effective permittivity and/or the effective permeability of the composite medium is achieved. This temporal control arises by virtue of a shift, even if relatively modest, of the resonant frequency responsive to a changed gain condition, in view of the very close proximity of the gain medium layer 1506 to the metallic feature layer 1502 such that gain is "coupled" into the resonant response.

In one embodiment, the metallic feature layer 1502 and gain medium layer 1506 are in a mutually "pre-tuned" configuration such that a transmitting metamaterial state is achieved between a radiation source 1512 and a radiation detector 1514 when the electrical pump current is at a nominal operating level, resulting in an "ON" modulation signal. Then, upon variation of the electrical pump current, detuning from the resonant state occurs, resulting in an "OFF" modulation signal.

Figure 16:
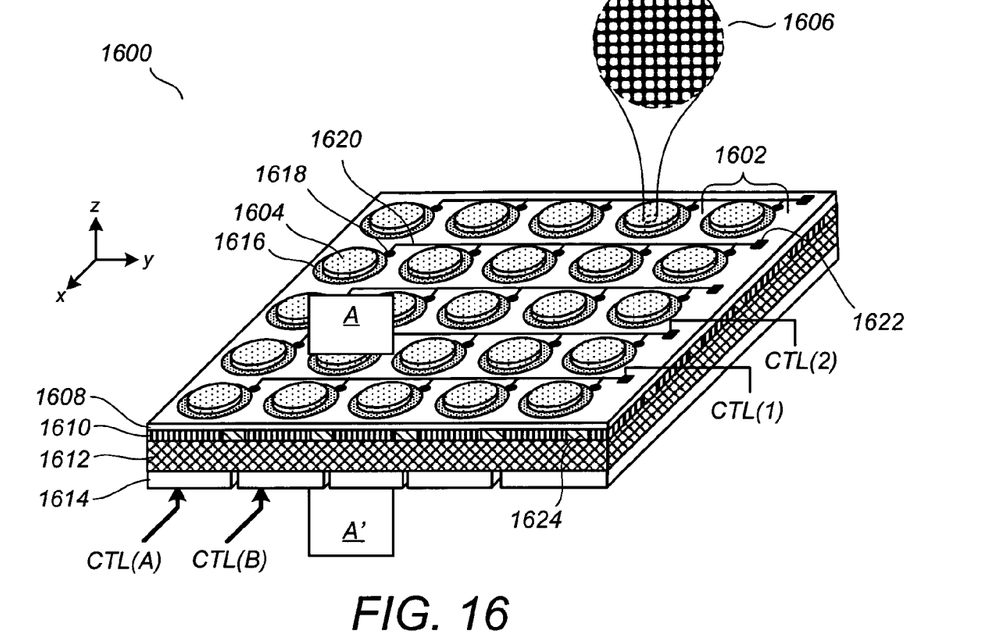
FIG. 16 illustrates an apparatus for controlling propagation of incident radiation according to an embodiment.
Figure 17:
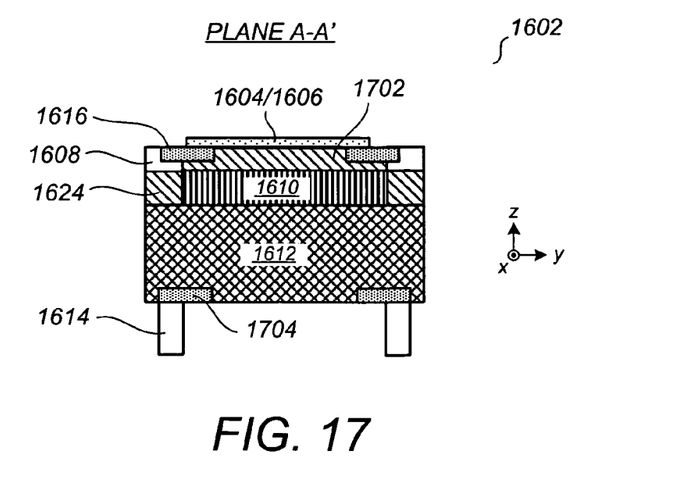
FIG. 17 illustrates a cross-sectional view of the apparatus of FIG. 16.

FIGS. 16-17 illustrate an apparatus 1600 for controlling propagation of incident radiation at an operating frequency according to an embodiment, wherein a two-dimensionally arrayed version of the apparatus 1500 of FIG. 15 is provided on a single substrate. Apparatus 1600 comprises an array of substantially identical modulating units 1602, each modulating the propagation of a distinct radiation beam between a source (not shown) disposed immediately above each modulating unit 1602 and a receiver (not shown) disposed immediately below each modulating unit 1602. Carried by electrical leads 1620 above and doped semiconductor leads 1614 below, control signals CTL(1), CTL(2), etc. are provided along a first dimension of the array and control signals CTL(A), CTL(B), etc. are provided along a second dimension of the array to provide, in a crossbar-like fashion, an individual electrical control signal to each modulating unit 1602.

Each modulating unit 1602 comprises a metallic feature layer 1604, such as a metallic fishnet pattern 1606, a contact pad 1618, an ohmic contact ring 1616, a first semiconductor layer 1702 (doped p or n), a multiple quantum well layer 1610, a second semiconductor layer 1612 (doped n or p), and ohmic contacts 1704 as shown. The different multiple quantum well gain media are formed from a common multiple quantum well layer that is disordered at separation zones 1624 to provide electrical separation thereamong. A patterned insulating layer 1608 provides electrical separation among the different metallic feature layers 1604.

Particular materials and dimensions for optical control devices and radiation control devices having the above-described structures and functionalities can be identified for the relevant operating wavelength by a person skilled in the art using known design techniques in view of the present disclosure. MEMS devices and surface acoustic wave (SAW) devices for achieving the above-described control functionalities could also be readily identified and implemented by a person skilled in the art using known MEMS and SAW technologies in view of the present disclosure. Fabrication of devices according to one or more of the embodiments can be achieved using known integrated circuit fabrication methods including, but not limited to: deposition methods such as chemical vapor deposition (CVD), metal-organic CVD (MOCVD), plasma enhanced CVD (PECVD), chemical solution deposition (CSD), sol-gel based CSD, metal-organic decomposition (MOD), Langmuir-Blodgett (LB) techniques, thermal evaporation/molecular beam epitaxy (MBE), sputtering (DC, magnetron, RF), and pulsed laser deposition (PLD); lithographic methods such as optical lithography, extreme ultraviolet (EUV) lithography, x-ray lithography, electron beam lithography, focused ion beam (FIB) lithography, and nanoimprint lithography; removal methods such as wet etching (isotropic, anisotropic), dry etching, reactive ion etching (RIE), ion beam etching (IBE), reactive IBE (RIBE), chemical-assisted IBE (CAIBE), and chemical-mechanical polishing (CMP); modifying methods such as radiative treatment, thermal annealing, ion beam treatment, and mechanical modification; and assembly methods such as wafer bonding, surface mount, and other wiring and bonding methods.

Whereas many alterations and modifications of the embodiments will no doubt become apparent to a person of ordinary skill in the art after having read the foregoing description, it is to be understood that the particular embodiments shown and described by way of illustration are in no way intended to be considered limiting. For example, it is to be appreciated that the terms microelectromechanical and MEMS also encompass the terms nanoelectromechanical and NEMS, respectively. By way of further example, although the temporal control of incident radiation is described in one or more of the above embodiments in the context of modulation with an information signal, which usually entails a relatively high frequency modulation rate (e.g., in the MHz or GHz range), in other embodiments the temporal control can be quasi-static in nature, with control signals being applied and/or varied as slowly as once per day, week, or year (e.g., in a re-calibration context), or applied in a one-time manner (e.g., in a factory settings context). Thus, reference to the details of the described embodiments are not intended to limit their scope.

What is claimed is:

1. An apparatus for controlling propagation of incident radiation, comprising a composite material operable to exhibit at least one of a negative effective permittivity and a negative effective permeability for incident radiation at an operating frequency, the composite material comprising electromagnetically reactive cells of small dimension relative to a wavelength of said incident radiation, wherein each of said electromagnetically reactive cells comprises first and second electromagnetically reactive segments microelectromechanically movable relative to each other according to an applied control signal such that at least one of a capacitive and inductive property of said electromagnetically reactive cells is temporally controllable according to the applied control signal.

2. The apparatus of claim 1, wherein said first and second electromagnetically reactive segments for each of said electromagnetically reactive cells are mutually positioned in (i) a resonant configuration for a first state of said applied control signal sufficient for at least one of said negative effective permittivity and negative effective permeability at said operating frequency, and (ii) in a substantially non-resonant configuration for a second state of said applied control signal insufficient for said at least one of said negative effective permittivity and negative effective permeability at said operating frequency.

3. The apparatus of claim 2, wherein said first state of said applied control signal corresponds to an uncontrolled state, whereby said composite material is tuned for said resonant configuration at said operating frequency when no control signal is applied and is detuned to said substantially non-resonating configuration when the control signal is applied at said second state.

4. The apparatus of claim 1, said first and second electromagnetically reactive segments being disposed along first and second planes, respectively, wherein at least one of a relative proximity and a relative angle between said first and second planes is altered by said microelectromechanical movement.

5. The apparatus of claim 4, wherein said first and second electromagnetically reactive segments are comparable to each other with respect to at least one of a shape, an area, and a conductor length thereof.

6. A method for controlling radiation comprising operating the apparatus of claim 1.

7. An apparatus for controlling propagation of incident radiation, comprising a composite material operable to exhibit at least one of a negative effective permittivity and a negative effective permeability for incident radiation at an operating frequency, the composite material comprising:
a first layer comprising a metallic fishnet membrane having air holes; and
a second layer generally parallel to said first layer and spatially separated therefrom, said second layer comprising one of a conductor material and a doped semiconductor material;
wherein said first layer is microelectromechanically movable toward and away from said second layer responsive to an applied control signal for allowing dynamic control of at least one of the effective permittivity and effective permeability of said composite material at the operating frequency.

8. The apparatus of claim 7, wherein said first layer deforms between a substantially planar shape and a shallow concavity directed toward said second layer responsive to changes in said applied control signal.

9. The apparatus of claim 8, wherein said first layer comprises a continuous metallic membrane patterned with nonmetallic holes, wherein said first layer is suspendably disposed above said second layer, and wherein said first layer deforms downward toward said second layer by electrostatic actuation responsive to said applied control signal.

10. The apparatus of claim 9, wherein said second layer is substantially identical to said first layer and deforms upward toward said first layer by said electrostatic actuation.

11. The apparatus of claim 8, wherein said first layer comprises metallic resonant structures formed on a third layer, the third layer comprising a doped semiconductor of a membraneous thickness, wherein said third layer is suspendably disposed above said second layer, and wherein said first and third layers deform downward toward said second layer by electrostatic actuation responsive to said applied control signal.

12. A method for controlling radiation comprising operating the apparatus of claim 7.

13. An apparatus for controlling propagation of incident radiation at an operating frequency, comprising:
a composite medium comprising a layer of metallic features of small size relative to a wavelength of the incident radiation, said layer being periodically patterned such that said composite medium is operable to exhibit at least one of a negative effective permittivity and a negative effective permeability for the incident radiation at the operating frequency;
a slab positioned substantially adjacent to said composite medium, said slab comprising an electro-optic material substantially transparent at the operating frequency and having an intrinsic refractive index that is variable according to a strength of an electric field therein; and
first and second electrical conductors positioned such that an electric field associated with a potential difference therebetween passes through said slab in an immediate vicinity of said layer of metallic features;
whereby at least one of the effective permittivity and the effective permeability of the composite medium is temporally controllable according to an electrical control signal applied across said first and second electrical conductors.

14. The apparatus of claim 13, wherein said slab comprises one of lithium niobate and lithium tantalate, and wherein said temporal control of said at least one of the effective permittivity and the effective permeability is achieved at least in part due to variations in said intrinsic refractive index of said slab induced by said applied electrical control signal.

15. The apparatus of claim 13, wherein said layer of metallic features comprises one of (a) a continuous metallic membrane patterned with nonmetallic holes, and (b) a layer of discrete metallic resonant structures.

16. The apparatus of claim 13, wherein said slab is horizontally disposed, wherein said layer of metallic features is positioned on an upper surface of said slab, wherein said first electrical conductor is positioned above said layer of metallic features and separated therefrom by an insulating layer, and wherein said second electrical conductor is positioned immediately beneath a lower surface of said slab.

17. The apparatus of claim 13, wherein said slab is horizontally disposed, wherein said layer of metallic features is positioned on an upper surface of said slab, wherein said first and second electrical conductors are positioned on said upper surface on laterally opposite sides of said layer of metallic features to form a longitudinal transmission line along said slab, and wherein said incident radiation propagates in a generally vertical direction through said layer of metallic features and said slab.

18. A method for controlling radiation comprising operating the apparatus of claim 13.

19. An apparatus for controlling propagation of incident radiation at an operating frequency, comprising:
a slab of material that is piezoelectric, electro-optic, and substantially transparent at the operating frequency;
a composite medium comprising a layer of metallic features of small size relative to a wavelength of the incident radiation, said layer of metallic features being periodically patterned such that said composite medium is operable to exhibit at least one of a negative effective permittivity and a negative effective permeability for the incident radiation at the operating frequency, said layer of metallic features being disposed longitudinally along a surface of said slab;

a surface acoustic wave launching device coupled to said slab to launch surface acoustic waves thereon in accordance with an applied electrical control signal, the surface acoustic waves propagating on said slab along a longitudinal path that is coincident with said longitudinally disposed layer of metallic features;

whereby, for at least one location along said layer of metallic features coincident with said surface acoustic waves, at least one of the effective permittivity and the effective permeability of the composite medium is temporally varied according to said applied electrical control signal.

20. The apparatus of claim 19, wherein said composite medium is configured to exhibit both a negative effective permittivity and a negative effective permeability at said operating frequency when no acoustic surface wave energy is present.

21. The apparatus of claim 20, wherein said composite medium is configured to detune from at least one of said negative effective permittivity and negative effective permeability at said operating frequency at locations where an acoustic surface wave intensity peak is present.

22. The apparatus of claim 19, wherein said slab comprises one of lithium niobate and lithium tantalate, and wherein said acoustic wave launching device comprises an interdigitated transducer.

23. The apparatus of claim 19, wherein said layer of metallic features comprises one of (a) a continuous metallic membrane patterned with nonmetallic holes, and (b) a layer of discrete metallic resonant structures.

24. A method for controlling radiation comprising operating the apparatus of claim 19.

25. An apparatus for controlling propagation of incident radiation at an operating frequency, comprising:

a composite medium comprising a layer of metallic features of small size relative to a wavelength of the incident radiation, said layer being a continuous metallic membrane periodically patterned with nonmetallic holes such that said composite medium is operable to exhibit at least one of a negative effective permittivity and a negative effective permeability for the incident radiation substantially perpendicular to said layer of metallic features at the operating frequency;

an electrically pumped gain medium layer proximal to said layer of metallic features and having an amplification band that includes said operating frequency; and a source of electric current for pumping said gain medium, wherein said source is configured to vary said pump current according to an applied control signal for providing temporal control of at least one of the effective permittivity and the effective permeability of the composite medium.

26. The apparatus of claim 25, wherein said composite medium and said gain medium layer are mutually configured such that said at least one of the negative effective permittivity and negative effective permeability are exhibited at the operating frequency when a predetermined nominal pump current is provided, and wherein said composite medium and said gain medium layer are mutually configured to detune said at least one of the negative effective permittivity and negative effective permeability at the operating frequency upon variation of said pump current from said predetermined nominal level.

27. The apparatus of claim 25, wherein said layer of metallic features further serves as a node through which pump current passes between said source and said gain medium layer.

28. The apparatus of claim 27, wherein said operating frequency is in one of an optical and near infrared frequency range, and wherein said gain medium layer comprises multiple quantum wells positioned not more than 100 nm away from said continuous metallic membrane.

29. The apparatus of claim 27, further comprising a plurality of said composite media disposed on a common semiconductor substrate but being electrically isolated from each other, each of said composite media having an associated distinct multiple quantum well gain medium and controlling a distinct beam of incident radiation according to a distinct applied control signal, wherein said respective multiple quantum well gain media are formed from a common multiple quantum well layer that is disordered according to a spatial pattern that provides electrical separation thereamong.

30. A method for controlling radiation comprising operating the apparatus of claim 25.

\* \* \* \* \*